(12) United States Patent
Palmer et al.

(10) Patent No.: US 10,746,377 B2
(45) Date of Patent: Aug. 18, 2020

(54) THIN LAMINAR MATERIAL FOR PRODUCING SHORT WAVE INFRARED EMISSION

(71) Applicant: Cyalume Technologies, Inc., West Springfield, MA (US)

(72) Inventors: William R. Palmer, Rescue, CA (US); Stephen L. Palmer, Cameron Park, CA (US)

(73) Assignee: Cyalume Technologies, Inc., West Springfield, MA (US)

( * ) Notice: Subject to any disclaimer, the term of this patent is extended or adjusted under 35 U.S.C. 154(b) by 0 days.

(21) Appl. No.: 16/044,294

(22) Filed: Jul. 24, 2018

(65) Prior Publication Data

US 2019/0113207 A1 Apr. 18, 2019

Related U.S. Application Data

(60) Provisional application No. 62/536,253, filed on Jul. 24, 2017, provisional application No. 62/536,258, filed on Jul. 24, 2017.

(51) Int. Cl.
*F21V 9/30* (2018.01)
*F21V 9/04* (2018.01)
(Continued)

(52) U.S. Cl.
CPC .............. *F21V 9/30* (2018.02); *F21V 9/04* (2013.01); *F21V 17/04* (2013.01); *G02B 1/04* (2013.01);
(Continued)

(58) Field of Classification Search
CPC ... F21V 9/04; F21V 9/30; F21V 17/04; G02B 1/04; G02B 5/208
See application file for complete search history.

(56) References Cited

U.S. PATENT DOCUMENTS 7,777,208 B2 8/2010 Cranor
2008/0246388 A1* 10/2008 Cheon ................. G02F 2/02
313/501
(Continued)

FOREIGN PATENT DOCUMENTS

WO WO2008112886 9/2008
WO WO2009036307 3/2009

OTHER PUBLICATIONS

Liang, Y. et al, "Extending the applications for lanthanide ions: efficient emitters in short-wave infrared persistent luminescence", J. Mater. Chem. C., vol. 5, pp. 6488-6492, (2017).

*Primary Examiner* — Eliza W Osenbaugh-Stewart
(74) *Attorney, Agent, or Firm* — McHale & Slavin, P.A.

(57) ABSTRACT

A short wavelength infrared (SWIR) energy emitting system or material for producing SWIR energy from an emission source emitting electromagnetic energy. The SWIR energy system or material comprises a phosphor material, an electromagnetic energy blocking member, a substrate for delivering the system or material to an electromagnetic energy emission source, and optionally, a securing member. The SWIR energy system or material may be in the form of a tape, sheet, or other laminar material capable of producing short wave infrared emission when excited at wavelengths shorter than that of the emission.

26 Claims, 10 Drawing Sheets

(51) Int. Cl.
   *G02B 5/28*   (2006.01)
   *G02B 1/04*   (2006.01)
   *G02B 5/22*   (2006.01)
   *G02B 5/20*   (2006.01)
   *F21V 17/04*  (2006.01)
   *C09K 11/77*  (2006.01)

(52) U.S. Cl.
   CPC .............. *G02B 5/208* (2013.01); *G02B 5/223* (2013.01); *G02B 5/285* (2013.01); *C09K 11/77* (2013.01)

(56) References Cited

U.S. PATENT DOCUMENTS

| 2009/0072166 A1* | 3/2009 | Cranor ...................... F21K 2/06 250/504 R |
| 2019/0128506 A1* | 5/2019 | Schmerling ............... F21V 9/30 |

* cited by examiner

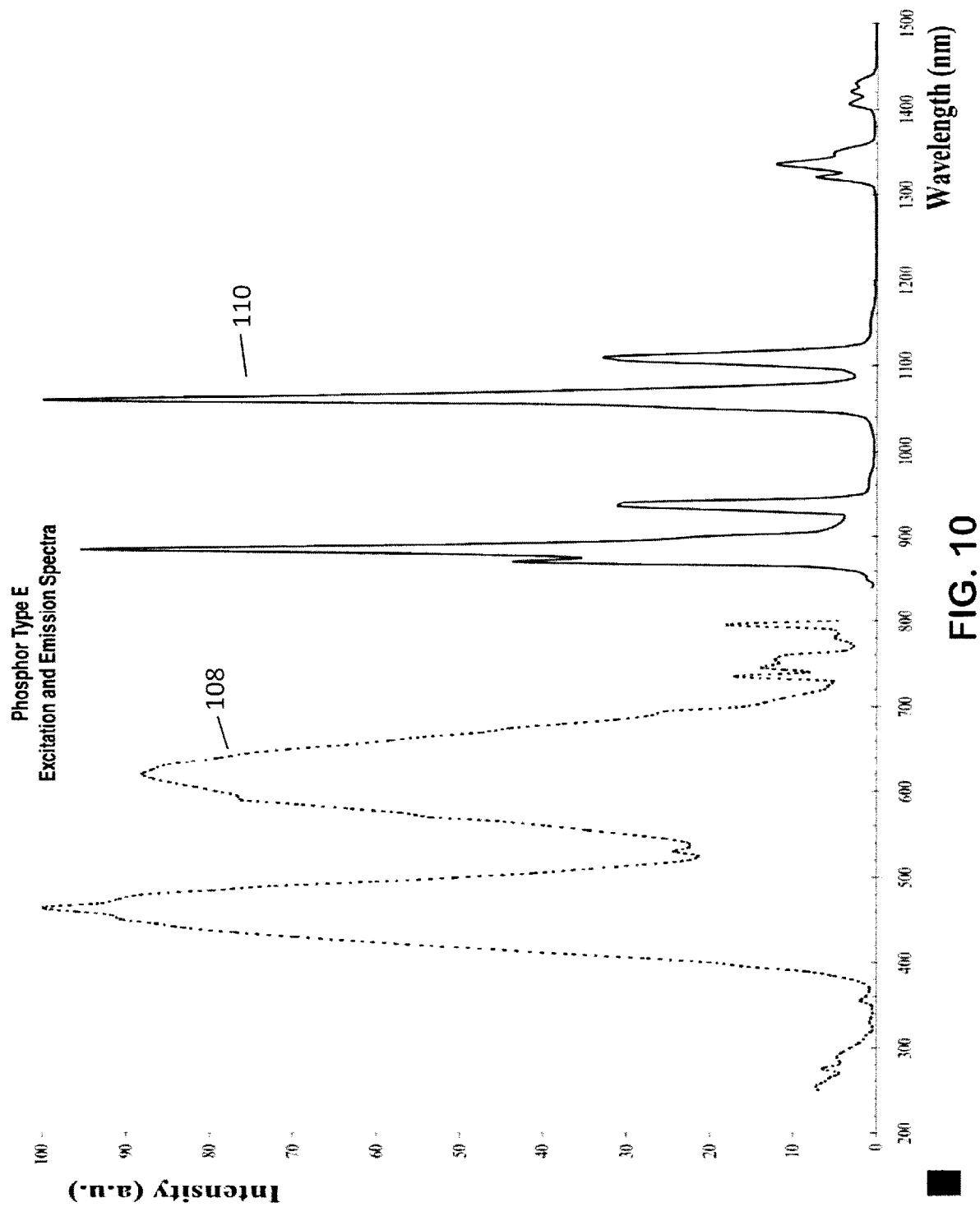

THIN LAMINAR MATERIAL FOR PRODUCING SHORT WAVE INFRARED EMISSION

CROSS REFERENCE TO RELATED APPLICATIONS

In accordance with 37 C.F.R. 1.76, a claim of priority is included in an Application Data Sheet filed concurrently herewith. Accordingly, the present invention claims priority to U.S. Provisional Patent Application No. 62/536,253 entitled "THIN LAMINAR MATERIAL FOR PRODUCING SHORT WAVE INFRARED EMISSION" filed Jul. 24, 2017 and to U.S. Provisional Patent Application No. 62/536,258, entitled "LIGHT WEIGHT APPLIANCE TO BE USED WITH SMART DEVICES TO PRODUCE SHORT-WAVE INFRARED EMISSION" filed Jul. 24, 2017. The contents of the above referenced applications are incorporated herein by reference in its entirety.

FIELD OF THE INVENTION

The present disclosure relates to a short wavelength infrared (SWIR) energy emitting system that can be conveniently utilized to produce SWIR energy from existing light emitting items; and more particularly, to tape, sheet or other laminar material capable of producing short wave infrared emission when excited at wavelengths shorter than that of the emission wavelengths.

Near-infrared radiation has been used for some time to make observations in the dark. For example, the study of nocturnal animals has been significantly enhanced with the use of night-vision equipment and near-infrared illuminators. Night-vision equipment and near-infrared illuminators have also been used for law-enforcement and military purposes. The ability of one to "see in the dark" can provide a significant advantage over those who cannot. This advantage is diminished as adversaries gain access to this technology. A solution may be realized through the application of infrared energy sources that are not visible to standard night-vision equipment.

The use of Short Wave Infrared (SWIR) energy provides one such solution. The SWIR band is generally considered to be those wavelengths between approximately 1000 nanometers and approximately 3000 nanometers. The Near Infrared (NIR) band is generally considered to be those wavelengths between approximately 700 nanometers and 1000 nanometers. SWIR energy wavelengths are longer than those of Near Infrared (NIR) and, as such, are invisible to standard night vision equipment. Additionally, energy in the SWIR band is not visible to "day/night" cameras, which are capable of imaging in the NIR bands as well as the visible (VIS). SWIR imagers typically employ InGaAs (indium gallium arsenide) chemistry in their imaging sensors. Since these imagers are difficult to manufacture and are relatively expensive, they have not proliferated to the extent that night vision equipment has and, therefore, the use of SWIR imagers and SWIR illuminators still offers a tactical advantage in many environments. The SWIR illuminators may, of course, also be used for signaling and identification purposes in addition to being sources of illumination for imagers. SWIR energy may be generated by special LEDs, lasers or filtered incandescent sources, or other known means. A variety of electrically powered SWIR emitting devices are available for tactical use, most being battery powered. As users transition from near-infrared and standard night vision equipment to SWIR imagers, there is a growing need for SWIR systems and devices.

SUMMARY OF THE INVENTION

It is, accordingly, an object of the invention to provide a short wavelength infrared (SWIR) energy emitting system that can be conveniently utilized to produce SWIR energy from existing electromagnetic energy, i.e. visible or ultraviolet light emitting items, such as smart phones, tablets, flashlights, vehicle lighting systems, residential lighting systems and similar light emitting devices. Such a system would be invaluable in that nearly any light producing item could be converted to produce SWIR emission. Further, the system could incorporate a visible and NIR light blocking member that would render the emission source invisible to NIR and visible detection systems. Such a system would provide a covert source of illumination that would not be readily detected by others. If the system was in the form of a thin, laminar sheet, or a tape, it could readily be applied to light emitters on smart devices, such as the camera flash on a smart phone. Additionally, if the system comprised an adhesive, such as a pressure sensitive adhesive, it could be quickly and conveniently applied to the face of a light emitter, such as a vehicle headlight, thereby converting the headlight from a visible lighting source to a high-powered SWIR source. Ideally, the sheet or tape would be easily trimmed and adjusted to fit specific applications, such as intricate geometries and warped surfaces.

Generally, the present invention provides a product which may be in the form of a tape, sheet or other thin, laminar material (henceforth referred to simply as "tape") that may be readily affixed to visible or ultraviolet light producing devices, such as smart phones, smart tablets, flashlights or the like. The tape produces SWIR energy emission when optically coupled to the visible light producing device when the source of visible light is switched on. Additionally, the instant invention could be applied to vehicle running lights, emergency beacons, instrument panel lights, traffic signal lights, aircraft operating and landing lights, and any other light source for which it may be desirable to convert visible light to SWIR. The tape could also serve to at least partly block visible and NIR emissions from the light-producing device to which it is applied, thereby rendering these emissions invisible to the naked eye, night vision devices and day-night cameras.

Such a tape would be highly desirable for situations where the user needs to produce SWIR energy but must be careful not to emit visible or NIR energy. For instance, a vehicle which had its headlights covered with this tape could be driven covertly by an operator equipped with a SWIR imaging system. A night-time drone operator could easily add a few pieces of this tape to the position lights on the drone so that its location and relation to other objects could be visually observed with the aid of a SWIR camera, while the drone would be invisible to those not equipped with the SWIR camera. The tape could be removed if it was desired to repair the drone to its normal lighting mode. In many instances, it would also be highly beneficial if the tape was compact, lightweight, capable of surviving exposure to rain, sunlight, and temperature extremes, and was mechanically robust. In some cases, however, it may be preferred to render the tape non-functional upon extended exposure to the elements or upon removal from the object to which it had been affixed, thus preventing un-authorized re-use. Both functions are anticipated by this invention. Such a tape would find great utility if the visible light emitting device could be switched on and off as may be desired, for example in a pre-determined pattern, thereby permitting coded signals to be produced. A smart phone or tablet could easily perform this function when outfitted with the SWIR tape and running a suitable software application.

In an illustrative embodiment, the invention may include a short wavelength infrared (SWIR) energy emitting system for producing SWIR energy from an emission source emitting electromagnetic energy, such as visible or ultraviolet light, comprising a phosphor material; an electromagnetic energy blocking member; and a substrate for delivering said system to an emission source. The system may further include a securing member, such as an adhesive.

An efficient, compact, light-weight, energy conversion tape, suitable for the intended application, has been created using certain, rare-earth phosphors in combination with various selective wavelength-blocking optical filters. The filters, at least partially, block emissions of NIR and/or visible light. Preferably the filters block these emissions sufficiently to prevent observation by the naked eye, by the use of night vision equipment, day-night cameras, or other detection devices, sensors, or detection technology.

In one aspect of the invention, the tape takes the form of a thin sheet with an attachment means, preferably an adhesive backing; said backing allowing the tape to be readily attached to the visible light or ultraviolet emitting feature of the light emitting device.

Another aspect of the invention incorporates a mechanism to prevent re-use of the tape so that discarded tape materials cannot be re-used by an adversary.

Other aspects of the disclosure include various flexible, semi-flexible, or stretchable tapes that are configured to be readily applied to visible light or ultraviolet emitting devices.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE DRAWINGS

FIG. 10 illustrates an absorption and emission spectra of a phosphor that exhibits strong absorption between about 380 nm and about 800 nm, and desired emission between about 1040 nm and about 1140 nm.

DETAILED DESCRIPTION OF THE INVENTION

Figure 1:
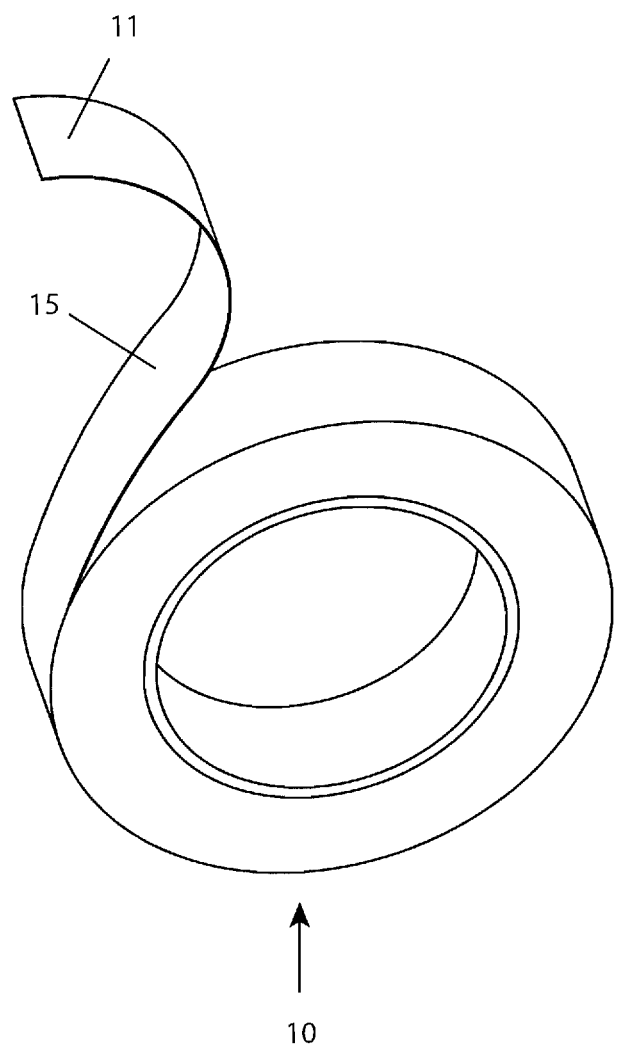
FIG. 1 illustrates an embodiment of a short wavelength infrared (SWIR) energy emitting system for producing SWIR energy from an emission source emitting electromagnetic energy, shown as a SWIR emitting tape supplied in a rolled form.

While the present invention is susceptible of embodiment in various forms, there is shown in the drawings and will hereinafter be described a presently preferred, albeit not limiting, embodiment with the understanding that the present disclosure is to be considered an exemplification of the present invention, and is not intended to limit the invention to the specific embodiments illustrated.

The present invention is directed towards a short wavelength infrared (SWIR) energy emitting system for producing SWIR energy from an emission source emitting electromagnetic energy, preferably visible or ultraviolet light, referred to generally as a SWIR energy system or material 10. The SWIR energy system or material 10 comprises a phosphor material; an electromagnetic energy blocking member; a substrate for delivering said system to an emission source, and optionally, a securing member. The phosphor allows the SWIR energy system or material 10 to emit SWIR, preferably when excited at its absorption wavelengths associated with visible or ultraviolet light.

Figure 7:
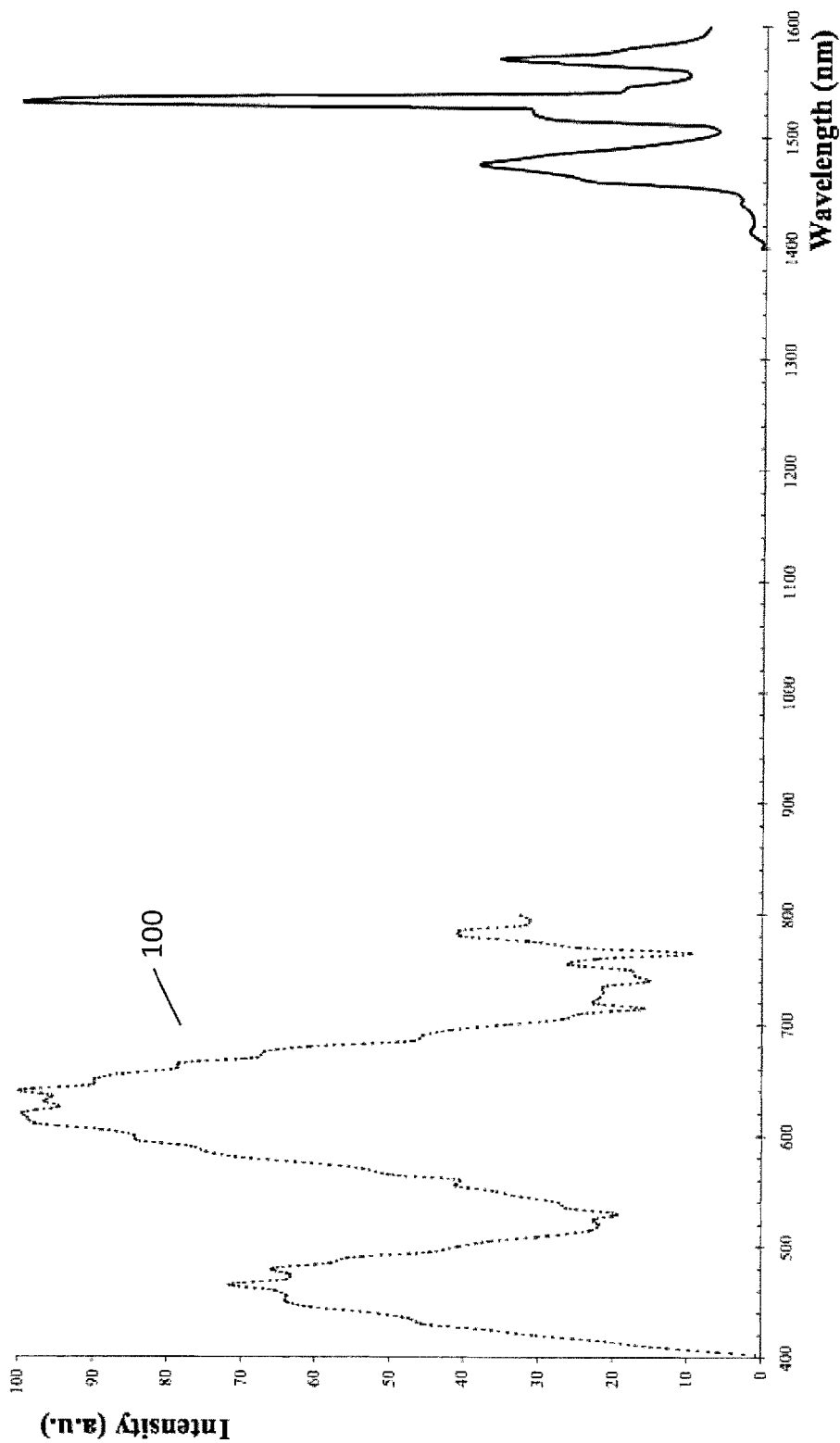
FIG. 7 illustrates an absorption and emission spectra of a phosphor which exhibits strong absorption between about 540 nm and 700 nm.

Phosphors that are capable of producing SWIR energy when exposed to visible light are known. For example, the SWIR energy system or material 10 may use one or more rare-earth phosphors, i.e. lanthanides (those chemicals listed on the chemical table having atomic numbers from 57-71, including Lanthanum, (La), Cerium (Ce), Praseodymium (Pr), Neodymium (Nd), Promethium (Pm), Samarium (Sm), Europium (Eu), Gadolinium (Gd), Terbium (Tb), Dysprosium (Dy), Holmium (Ho), Erbium (Er), Thulium (Tm), Ytterbium (Yb), and Lutetium (Lu)), as well as Scandium and Yttrium may be used. Illustrative examples of the desired phosphor preferably emit energy at various wavelengths of between about 1000 nm and about 3000 nm. One illustrate example may be the phosphor which produces a Nd:YAG laser. Another illustrative example is a phosphor capable of emitting energy at various wavelengths, between about 1400 nm and about 1600 nm, when properly excited at its absorption wavelengths of between about 400 nm and about 800 nm. As used herein, the term "about" or "approximately" means plus or minus 10% of the stated value. FIG. 7 shows absorption and emission spectra of another type of phosphor. As illustrated, an example of a that phosphor exhibits strong absorption 100 between about 540 nm and 700 nm. The data display screens of smart devices typically produce full-color images by combining various levels of red, blue and green light. Red light, as seen by the human eye, has a wavelength of between approximately 620 nm and approximately 750 nm, so a light emitting smart device, such as a smart phone, with a data display screen comprising red emitters, typically LEDs, would be suitable for excitation of this phosphor. Blue light (approximately 450 nm-495 nm) and green light (approximately 495 nm-570 nm) could also be functional in this system with this phosphor to produce SWIR emission. Most incandescent light sources would also be suitable for excitation of the phosphor.

The term "phosphors", as used herein, also includes engineered fluorescers such as "quantum dots."

Figure 8:
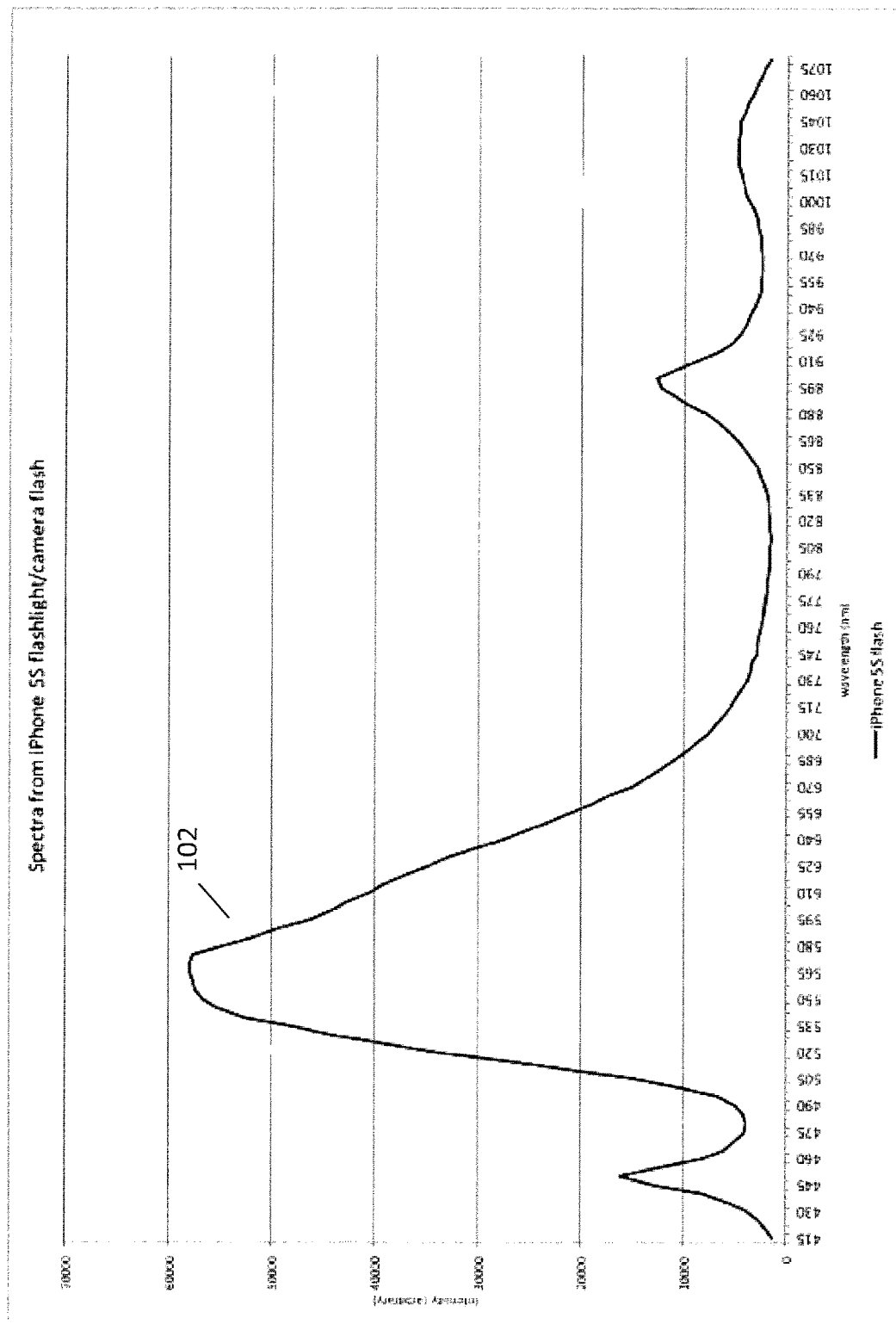
FIG. 8 is a spectra of a white light illuminator from an Apple iPhone 5S camera flash.

Many smart phones and other devices now have built-in cameras. In addition to the relatively low power LEDs in the data display screen, these devices also have built-in "white light" illuminators to provide light to the scene to be photographed. These light sources are most commonly very bright "white" LEDs. This light is rich in visible red light, as well as light of other wavelengths that can effectively excite a SWIR emitting phosphor. The spectra 102 of the white light illuminator in an Apple iPhone 5S camera flash is shown in FIG. 8 (emission spectra from a typical smart phone device). It can be seen from FIG. 7 and FIG. 8 that the light emitted by the iPhone camera flash contains light wavelengths that are within the excitation band of the phosphor. Since these white light emitters are exceptionally bright, they can be effectively used to excite a SWIR emitting phosphor, thereby producing high levels of emission from the SWIR phosphor. Of course, light emitters of low intensity may also be employed for this purpose.

Figure 3:
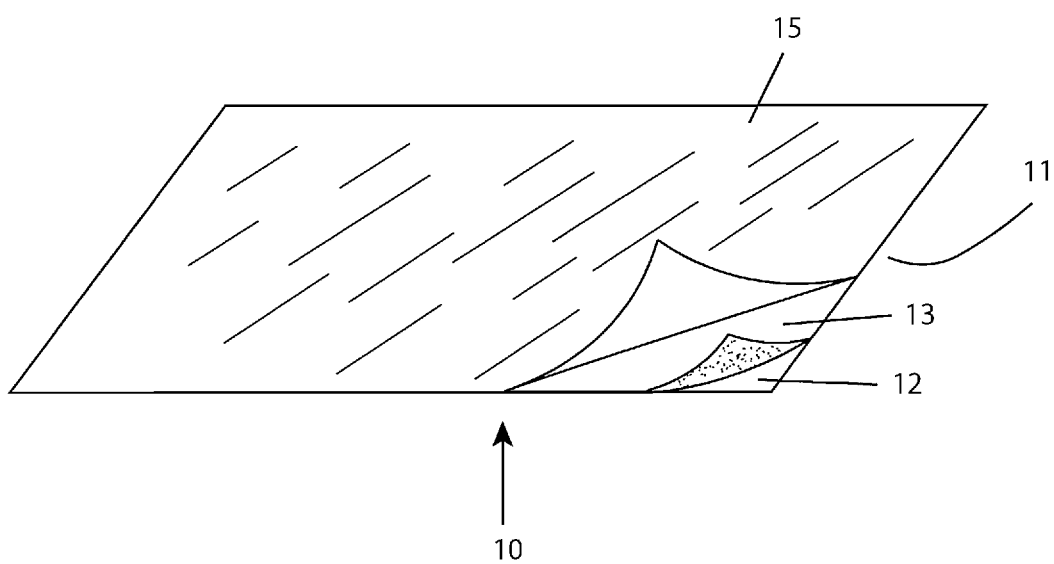
FIG. 3 illustrates the SWIR tape in a trimmable sheet form that can be fitted over a light emitting device. The layers are shown peeled back for clarity.
Figure 9:
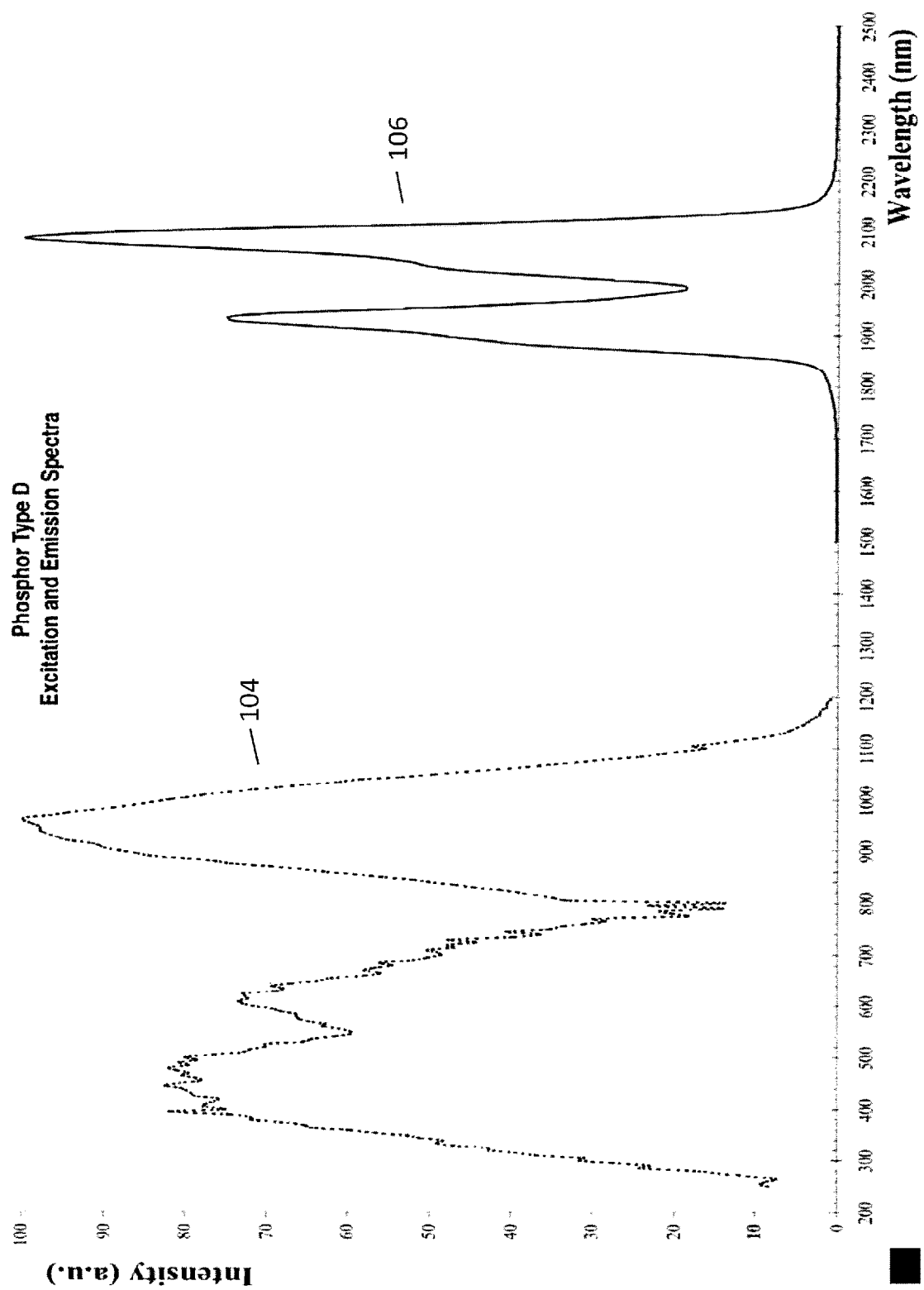
FIG. 9 illustrates an absorption and emission spectra of a phosphor that exhibits strong absorption between about 240 nm and about 1200 nm, and emission between about 1760 nm and about 2220 nm.

FIG. 9 shows absorption and emission spectra of another type of phosphor. As illustrated in FIG. 3, an illustrative example of a phosphor that exhibits strong absorption 104 between about 240 nm and about 1200 nm, and emission 106 between about 1760 nm and about 2220 nm.

FIG. 10 shows absorption and emission spectra of another type of phosphor. As illustrated in FIG. 10, an illustrative example of a phosphor that exhibits strong absorption 108 between about 380 nm and about 800 nm, and desired emission 110 between about 1040 nm and about 1140 nm.

Preferably, the SWIR energy system or material 10 is designed to produce a SWIR energy emitting source that does not also produce visible or NIR emission; it is desirable that any visible or NIR emissions be blocked with a suitable electromagnetic energy blocking member, such as a filter. The filter, preferably, is at least partially transparent to the SWIR energy of interest, so that this energy may be usefully emitted from the device. A selective wavelength filter element may be created using a combination of organic or other dyes, such as anthraquinones, dianthrones, cyanines, heteroaromatics, metal dithiolenes, perylenes, phthalocyanines, rhodamines, tetraaryldiamines, thiazines, triarylamines, or triarylmethanes. The dyes may be incorporated into a substrate or carrier, such as a plastic resin, including plastisol, organisol, or other materials which will form a "solid solution" in which the dye is efficiently dispersed. The dyes and any support resin must permit the transmission of SWIR energy so that useful energy can leave the device. As an alternate to a dyed filter, a thin-film filter, such as a dielectric filter, may be utilized to block visible and NIR energy while permitting the SWIR energy to pass. A combination of these and other filter types may also be advantageously employed.

The SWIR energy system or material 10 then comprises a light-weight and convenient mechanism of producing SWIR energy from existing electromagnet energy sources, preferably visible or ultra-violet energy sources.

Adhesive and Substrate

Preferably, the adhesive and substrate may exhibit elastic/flexible properties so as to be stretched, without ripping or cracking, to fit a desired surface. The substrate should be readily bondable to the phosphor layer. An illustrative example may be the commercially available adhesive 764 tape manufactured by 3M Company (formally known as Minnesota Mining and Manufacturing Company, Maplewood, Minn.). The 764 tape is a 0.005" thick, flexible vinyl tape, employing a rubber-based adhesive. Because this tape is somewhat elastic, it can be stretched to permit conformation to warped or irregular surfaces. The 764 tape also provides a good substrate to bond the phosphor layer.

Accordingly, the substrate must not disintegrate when the phosphor and/or the VIS/NIR blocker are applied, or have a low surface energy such that the phosphor layer does not bond thereto.

Electromagnetic Energy Blocking Member: VIS/NIR Filter

An illustrative example of an effective electromagnetic energy blocking member is a visible light/near infrared (VIS/NIR) filter that was created using a commercial product referred to as SPECTRE™ 160 (visibly-opaque IR transmitting (VOIRT) screen ink, which absorbs 200-1065 nm, and transmits>1165 nm), available from Epolin, Inc. (Newark, N.J.). The SPECTRE™ 160 was supplied in the form of an air dry, viscous ink that could be screen printed, or, alternately, applied in a controlled thickness layer by the use of doctor blades. In an illustrative example, the VIS/NIR filter layer was applied directly over the phosphor layer. After curing, the preferred thicknesses of the filter layer were between 0.0005" to about 0.020", although other thicknesses worked as well.

A second (dye) product EPOLIGHT™ 7527G (visible opaque dye, blocks light from 200 nm to 1065 nm), also from Epolin, can be used to produce a suitable VIS/NIR filter. This dye was supplied as a powder, and used by incorporating it into a suitable carrier which serves to both disperse the dye and bond it to a substrate, typically the phosphor layer. A suitable carrier may be, for example, a solvent-based, SWIR transparent, paint base. One suitable base is 5226 from Nazdar.

Phosphor Layer

Phosphors emitting SWIR when excited with visible or ultraviolet light are preferred. For SWIR photoluminescence, one or more lanthanide ions ($Ln^{3+}$) may be used, see Liang, et al., *J. Mater Chem C*, 2017, 5, 6488. The phosphor layer may be designed to contain the phosphor in a binder/carrier. A preferred, albeit not limiting, binder/carrier utilized was product 3426, a UV cured urethane-based ink base from Nazdar (Shawnee, Kans.). This type of material provided good transparency to the excitation light and bonded exceptionally well to a variety of substrates, including 3M's 764 product. The material is tough and flexible after curing, allowing the finished product to be stretched and flexed without damage. It was found that the bond between the 3426 and the 764 products was both a mechanical bond and a chemical bond. Preferably, the dry powdered phosphor was mixed into the un-cured urethane product at concentrations of about 0.5% (W/W) to concentrations of about 50% (W/W), depending on the SWIR conversion efficiency and SWIR output desired for any given application to form a slurry. The slurry was then deposited onto the substrate, for example 3M product 764, in a controlled thickness, and later cured by application of ultraviolet light. After curing, a preferred, albeit not limiting, thickness of between 0.001" to about 0.080" was determined to be functional for the application.

A particularly functional form of the SWIR energy system or material 10 comprised a base material utilizing Orajet 3951A from Orafol (Avon, Conn.), a phosphor layer comprising Nazdar S226 ink base into which powdered phosphor had been admixed. The VIS/NIR blocking filter comprised Nazdar S226 into which Epolight 7527G had been thoroughly dispersed. The phosphor layer comprised a mixture containing approximately 40% phosphor, 40% S226, and 15-25%, preferably 20%, triethyl citrate (TEC) weight to weight. The TEC in this formulation functions as a plasticizer to improve the elongation property of the phosphor layer, thus preventing any cracking that would allow other energy sources to be exposed. Other plasticizers such as benzoates, adipates, and citrates may be employed as well. This material was deposited on the base material utilizing doctor blades to yield a wet thickness of approximately 0.005". The product was then cured in an oven at 168° F. for 12 minutes. The product was removed from the oven and allowed to cool to room temperature.

The VIS/NIR blocking filter comprised a mixture containing approximately 2% 7527G dye, 78% S226, and 15-25%, preferably 20%, triethyl citrate (TEC) weight to weight. This material was deposited on the previously produced phosphor layer utilizing doctor blades to yield a wet thickness of approximately 0.003". This VIS/NIR blocking filter layer was cured in an oven at 168° F. for 12 minutes. Two more VIS/NIR blocking layers were added to the first layer using the same deposition and curing process, resulting in a total VIS/NIR blocking filter layer thickness of approximately 0.009". The foregoing example is exemplary only, and variations with respect to layer composition and thickness are anticipated by this invention. This arrangement of materials was found to yield a product which was tough, elastic, and highly effective at converting visible light to SWIR energy, while blocking undesirable VIS/NIR energy. The precise thickness of both layers applied to the substrate can be adjusted as may be desired for optimal function for a particular application.

EXAMPLES

Figure 2:
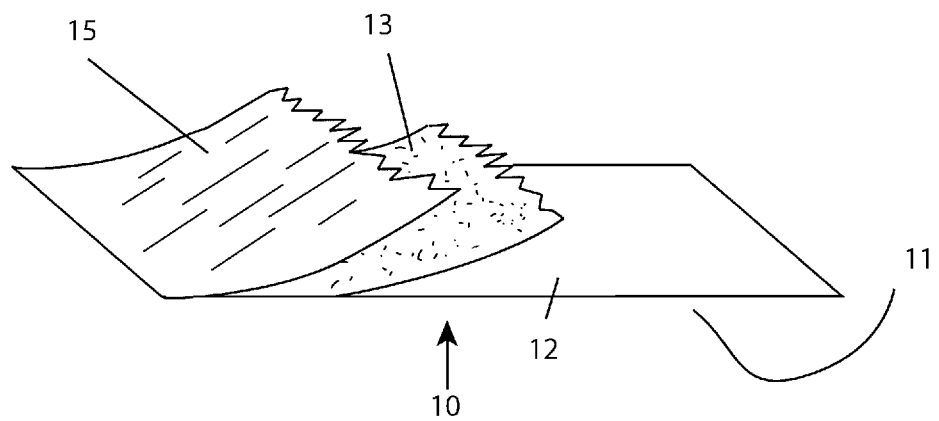
FIG. 2 is a perspective view the SWIR emitting tape, showing individual layers.

Referring to FIGS. 1 and 2, a short wavelength infrared (SWIR) energy emitting system that can be conveniently utilized to produce SWIR energy from existing light emitting items (SWIR energy system or material 10) is shown. The SWIR energy system or material 10 is illustrated as a tape form. The SWIR energy system or material tape 10 may comprise one or more of an adhesive attachment member 11, a substrate 12, phosphor 13, and an electrometric energy blocking member, illustrated herein as a VIS/NIR blocking filter 15. The SWIR energy system or material tape 10 may take any size and shape as may be desired. The SWIR energy system or material tape 10 may be tearable or cuttable so that a portion of the tape may readily be detached from the roll for use. The SWIR energy system or material tape 10 may also incorporate scoring or perforations to aid in portioning the tape.

The adhesive attachment member 11, preferably comprising a pressure-sensitive adhesive, permits the SWIR energy system or material tape 10 to be conveniently attached to a light emitting device, such as a smart phone camera flash or other light emitting source. The VIS/NIR blocking filter 15 prevents undesirable visible light, and any NIR energy that may be present, from being emitted from the SWIR energy system or material tape 10. The functionality of these features may be combined with other features; for example, phosphor 13 may comprise an adhesive agent that serves to bond the phosphor substrate 12 and VIS/NIR blocking filter 15 together. The phosphor 13 may be in the form of a slurry, paste, paint or ink which is directly deposited on the substrate 12 by brushing, rolling, screen-printing or any known process. A preferred method of producing the VIS/NIR blocking filter 15 employs dyes in a solvent-based ink or paint. Likewise, the VIS/NIR blocking filter 15 may be in the form of a slurry, paste, paint or ink, which is then deposited onto the layer produced by phosphor 13. Alternately, one or both of these layers may be applied in the form of a dry powder that is fused into the surface of a substrate. The phosphor 13 and/or the VIS/NIR blocking filter may also be in the form of a cast, molded, extruded or otherwise produced member so long as the functionality of these elements are preserved.

FIG. 3 illustrates a version of the SWIR energy system or material tape 10 in sheet form. Such a sheet comprises a similar structure to the SWIR energy system or material tape 10 described above, but may have dimensions to provide a device which emits electromagnetic energy, preferably visible light or ultraviolet light, such as an automobile headlight or other large light emitter, to be easily covered, potentially, by a single sheet. The sheet comprises a phosphor 13, a VIS/NIR blocking filter 15 and, preferably, an adhesive attachment member 11. The adhesive attachment member may also incorporate a substrate 12 to provide a durable structure for the system.

Figure 4:
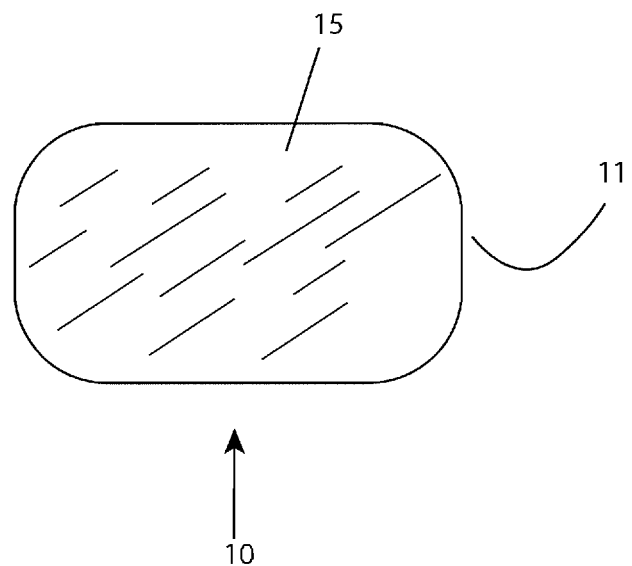
FIG. 4 represents the SWIR emitting tape shown as pre-cut or otherwise manufactured to a pre-determined size or shape.

FIG. 4 illustrates an embodiment of the SWIR energy system or material 10, showing a SWIR emitting tape that has been pre-cut or otherwise manufactured to a pre-determined size or shape. In the example for use with a smart phone, the tape has been die-cut to be of a size and shape to fit over the camera flash of a smart phone.

Figure 5:
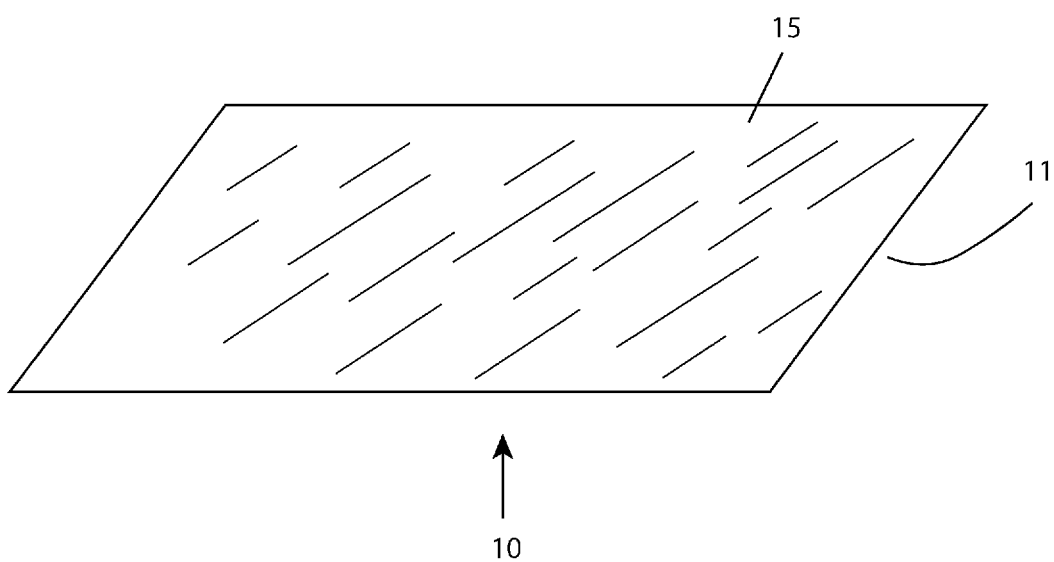
FIG. 5 illustrates the SWIR transmissive tape with the SWIR conversion layer omitted.

FIG. 5 shows a form of the SWIR energy system or material tape 10 in which the phosphor layer has been omitted. Since many visible light sources, such as incandescent sources, also produce SWIR energy, an effective SWIR emitter that does not emit visible or NIR energy can be produced by application of an optical filter that blocks the VIS/NIR, but permits the passage of SWIR energy. An integral adhesive attachment member permits convenient attachment to the visible light source.

Figure 6:
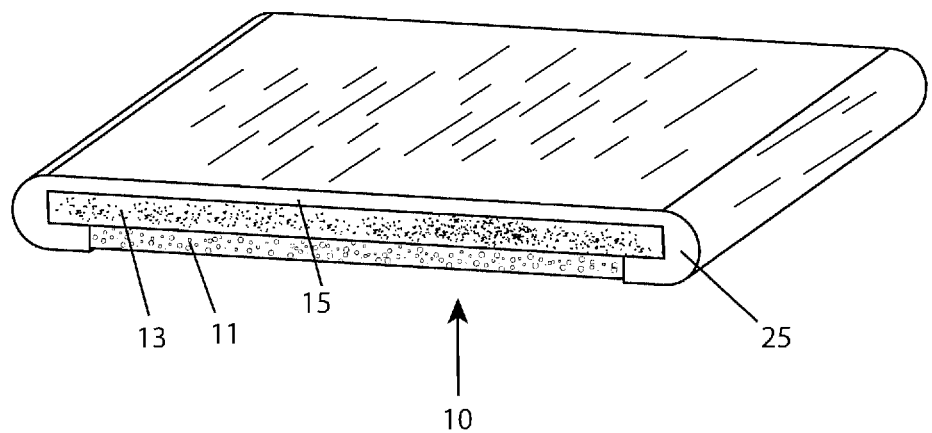
FIG. 6 illustrates the SWIR tape with an embodiment for preventing undesired lateral light emission.

FIG. 6 illustrates a form of the SWIR energy system or material tape 10 in which stray lateral VIS/NIR emission from the edges of the SWIR energy system or material tape 10 is eliminated by using an optical barrier. In this embodiment, a lateral light blocker 25 is formed as an extension of the VIS/NIR blocking filter 15. This filter is wider than the phosphor 13, and is wrapped around the edges of the SWIR energy system or material tape 10, where it may be held in place by adhesive 11. Any light attempting to emanate laterally, either via the adhesive 11, a substrate layer, or any other layer, is then blocked by this lateral light blocker. The same objective may be achieved by the application of a coating to the edges of the SWIR energy system or material tape 10, such as a paint, or a strip of tape that is opaque to the VIS/NIR light to be blocked. The SWIR energy system or material tape 10 may further contain scoring, perforations, or the like to permit a controlled portion of the tape to be readily detached from the remainder of the tape.

The SWIR energy system or material tape 10 may further contain a mechanism to render the SWIR energy system or material tape 10 useless to secondary users. Such mechanisms include, but are not limited to, dissolvable substrates, for example gelatins, starches or water-soluble polyethylene oxides. The SWIR energy system or material tape 10 may also be rendered useless to secondary users by permitting the light blocking layer to be readily separated from the phosphor layer so that they may disposed of separately, thereby making reuse unlikely. The SWIR energy system or material tape 10 may also be rendered useless by controlled disintegration through the application of highly frangible substrates, such as gelatins, cellulosics, or suspensions containing a high percentage of particulate solid matter. Additionally, disintegration agents, such as those employed in the medical pill industry, may be employed to further the tape's destruction upon exposure to water. The application of photo-sensitive materials that render the SWIR energy system or material tape 10 useless upon extended exposure to actinic light may also be employed for this propose. Such materials include VIS/NIR blockers comprising unstable dyes that lose their ability to block VIS/NIR when exposed to actinic light. Other materials that may be employed for this purpose include polymers that disintegrate upon exposure to actinic light, thereby causing the structure of the system to fall apart. Common animal gelatins, or cellulosics such as wood flour, when used in sufficient quantity (about 5-25% W/W) can yield a highly frangible product, in that they do not become plasticized in the solvents and/or plasticizers used in the phosphor layer or the VIS/NIR blockage layer, and therefore yield weak structures the are susceptible to disintegration when flexed, such as upon removal from an object to which the structure is adhered to. Products such as microcrystalline cellulose (MCC) may also be advantageously employed for this purpose in that this material is highly hygroscopic and exhibits swelling upon exposure to water. Said swelling literally pushing the product apart and rendering it useless. The exact percentage of the above materials with respect to the phosphor layer and/or the light blocking layer is dependent on the speed at which product destruction is desired and the ambient conditions in which it will be used. Since in the case of the use of microcrystalline cellulose, disintegration occurs when the MCC is hydrated, it must be incorporated in a manner that will permit water to reach the MCC. A convenient means to achieve this is to incorporate the MCC as a tie layer between the phosphor layer and the light blocking layers, whereupon exposure to water, the two layers will separate. Scorings, tear initiators or other mechanical weak links that cause the tape to disintegrate upon the tape's removal from the original surface may also be employed to frustrate re-use of the tape.

Patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A short wavelength infrared (SWIR) energy emitting system for producing SWIR energy from an emission source emitting electromagnetic energy comprising: a phosphor material layer; an electromagnetic energy blocking layer located on or applied to said phosphor material layer, said electromagnetic energy blocking layer configured to block emissions of NIR energy, or NIR and visible energy; a flexible or elastic substrate for delivering said system to an emission source emitting electromagnetic energy, said flexible or elastic substrate configured to be stretched to fit a desired surface comprising an emission source emitting electromagnetic energy, said phosphor material layer located on or applied to said flexible or elastic substrate.

2. The short wavelength infrared (SWIR) energy emitting system for producing SWIR energy from an emission source emitting electromagnetic energy according to claim 1, wherein said electromagnetic energy blocking member is a visible light filter configured to render said emission source invisible to an eye or a visible detection system.

3. The short wavelength infrared (SWIR) energy emitting system for producing SWIR energy from an emission source emitting electromagnetic energy according to claim 1, wherein said electromagnetic energy blocking member is a NIR filter configured to render said emission source invisible to NIR detection systems.

4. The short wavelength infrared (SWIR) energy emitting system for producing SWIR energy from an emission source emitting electromagnetic energy according to claim 1, wherein said electromagnetic energy blocking member is one or more wavelength-blocking optical filters configured to at least partially block emissions of NIR light, visible light, or combinations thereof.

5. The short wavelength infrared (SWIR) energy emitting system for producing SWIR energy from an emission source emitting electromagnetic energy according to claim 1, wherein said electromagnetic energy blocking member is a visible light and a NIR filter configured to render the emission source invisible to visible light and NIR detection systems.

6. The short wavelength infrared (SWIR) energy emitting system for producing SWIR energy from an emission source emitting electromagnetic energy according to claim 1, wherein said phosphor emits SWIR when excited by visible or ultraviolet light.

7. The short wavelength infrared (SWIR) energy emitting system for producing SWIR energy from an emission source emitting electromagnetic energy according to claim 6, wherein said phosphor emits energy at various wavelengths between about 1070 nm and 2090 nm when excited at its absorption wavelengths of between about 400 nm and 800 nm.

8. The short wavelength infrared (SWIR) energy emitting system for producing SWIR energy from an emission source emitting electromagnetic energy according to claim 1, wherein said substrate is a laminar material.

9. The short wavelength infrared (SWIR) energy emitting system for producing SWIR energy from an emission source emitting electromagnetic energy according to claim 8, wherein said laminar material is in the form of a sheet or roll.

10. The short wavelength infrared (SWIR) energy emitting system for producing SWIR energy from an emission source emitting electromagnetic energy according to claim 1, wherein said substrate material is stretchable to cover at least a portion of said emission source when applied thereto and does not permit visible or NIR energy to pass through when stretched.

11. The short wavelength infrared (SWIR) energy emitting system for producing SWIR energy from an emission source emitting electromagnetic energy according to claim 1, further including a securing member.

12. The short wavelength infrared (SWIR) energy emitting system for producing SWIR energy from an emission source emitting electromagnetic energy according to claim 11, wherein said securing member is an adhesive.

13. The short wavelength infrared (SWIR) energy emitting system for producing SWIR energy from an emission source emitting electromagnetic energy according to claim 12, wherein said securing member is a pressure sensitive adhesive.

14. The short wavelength infrared (SWIR) energy emitting system for producing SWIR energy from an emission source emitting electromagnetic energy according to claim 1, wherein said system further comprises one or more components that render said system frangible or capable of disintegration, wherein said system is configured for single use or application.

15. The short wavelength infrared (SWIR) energy emitting system for producing SWIR energy from an emission source emitting electromagnetic energy according to claim 1, wherein said emission source emits non-chemiluminescent electromagnetic energy.

16. The short wavelength infrared (SWIR) energy emitting system for producing SWIR energy from an emission source emitting electromagnetic energy according to claim 1, wherein said electromagnetic energy blocking member is an ultraviolet (UV) light filter configured to render said emission source invisible to UV detection systems.

17. The short wavelength infrared (SWIR) energy emitting system for producing SWIR energy from an emission source emitting electromagnetic energy according to claim 1, wherein said electromagnetic energy blocking member is a visible light, a NIR emissions, and an ultraviolet (UV) light filter configured to render the emission source invisible to visible light, NIR, and UV light detection systems.

18. The short wavelength infrared (SWIR) energy emitting system for producing SWIR energy from an emission source emitting electromagnetic energy according to claim 1, wherein said substrate material is stretchable to cover at least a portion of said emission source when applied thereto and does not permit ultraviolet (UV) energy to pass through when stretched.

19. A material for converting visible or ultraviolet light to short wavelength infrared (SWIR) energy comprising: a flexible or elastic substrate for delivering said material to a source of visible or ultraviolet light, said flexible or elastic substrate configured to be stretched to cover a surface having an emission source emitting electromagnetic energy or an object emitting electromagnetic energy; a phosphor layer which emits SWIR energy when exposed to visible or ultraviolet light emitted from said source of visible or ultraviolet light, said phosphor material layer located on or applied to said flexible or elastic substrate; a filter layer located on or applied to said phosphor layer and configured for preventing NIR from being emitted.

20. The material for converting visible or ultraviolet light to short wavelength infrared (SWIR) energy according to claim 19, wherein said material includes an adhesive material layer located or layered on a side of said flexible or elastic substrate which is opposite of said phosphor material layer.

21. The material for converting visible or ultraviolet light to short wavelength infrared (SWIR) energy according to claim 19, wherein said material is in a pre-cut form or having a predetermined size or shape.

22. The material for converting visible or ultraviolet light to short wavelength infrared (SWIR) energy according to claim 19, further including a lateral optical barrier.

23. The material for converting visible or ultraviolet light to short wavelength infrared (SWIR) energy according to claim 22, wherein said lateral optical barrier is formed as an extension of said filter layer, and wraps around at least one edge of said material and is held in place by an adhesive layer.

24. The material for converting visible or ultraviolet light to short wavelength infrared (SWIR) energy according to claim 19, wherein said visible or ultraviolet light is non-chemiluminescent light.

25. The material for converting visible or ultraviolet light to short wavelength infrared (SWIR) energy according to claim 19, wherein said filter layer is configured for preventing ultraviolet (UV) light from being emitted.

26. The short wavelength infrared (SWIR) energy emitting system for producing SWIR energy from an emission source emitting electromagnetic energy according to claim 1, wherein said electromagnetic energy blocking member is one or more wavelength-blocking optical filters configured to at least partially block emissions of ultraviolet (UV).

* * * * *